(12) United States Patent
Gaus

(10) Patent No.: US 11,877,585 B2
(45) Date of Patent: Jan. 23, 2024

(54) DEHYDRATED VEGETABLE FOOD PRODUCT AND METHODS OF MAKING THE SAME

(71) Applicant: Douglas M. Gaus, Boise, ID (US)

(72) Inventor: Douglas M. Gaus, Boise, ID (US)

(73) Assignee: INNOVATION IN MIND, LLC, Boise, ID (US)

( * ) Notice: Subject to any disclaimer, the term of this patent is extended or adjusted under 35 U.S.C. 154(b) by 316 days.

(21) Appl. No.: 15/830,715

(22) Filed: Dec. 4, 2017

(65) Prior Publication Data
US 2018/0084808 A1    Mar. 29, 2018

Related U.S. Application Data

(62) Division of application No. 14/084,110, filed on Nov. 19, 2013, now Pat. No. 9,883,687.

(60) Provisional application No. 61/796,721, filed on Nov. 19, 2012.

(51) Int. Cl.
| | | |
|---|---|---|
| A23L 19/12 | (2016.01) | |
| A23L 19/18 | (2016.01) | |
| A23L 19/00 | (2016.01) | |
| A23L 27/26 | (2016.01) | |

(52) U.S. Cl.
CPC ............. *A23L 19/18* (2016.08); *A23L 19/03* (2016.08); *A23L 27/26* (2016.08)

(58) Field of Classification Search
CPC . A23V 2002/00; A23V 2300/10; A23J 3/227; A23L 19/18; A23L 27/26; A23L 19/03; A23L 3/00; A23L 1/217; A23L 19/00; A23L 19/12
See application file for complete search history.

(56) References Cited

U.S. PATENT DOCUMENTS

| | | | |
|---|---|---|---|
| 2,415,995 A | * | 2/1947 | Derby ............... A23B 7/022 426/456 |
| 3,973,047 A | | 8/1976 | Linaberry et al. |
| 4,698,230 A | | 10/1987 | Willard |
| 4,948,609 A | | 8/1990 | Nafisi-Movaghar |
| 5,071,661 A | | 12/1991 | Stubbs et al. |
| 5,492,704 A | | 2/1996 | Stubbs et al. |
| 5,532,453 A | | 7/1996 | Sheller |

(Continued)

OTHER PUBLICATIONS

Chen, W.S., D.C. Liu, and M.T. Chen, Determination of Quality Changes Throughout Processing Steps in Chinese-syle Pork Jerky, Asian-Aust. J. Anim. Sci. 2004, vol. 17, No. 5: 700-704. (Year: 2004).*

(Continued)

*Primary Examiner* — Hong T Yoo
(74) *Attorney, Agent, or Firm* — Hayes Soloway P.C.

(57) ABSTRACT

A vegetable food product and a method of making a dehydrated vegetable food product are provided. A quantity of vegetables is cut to a predetermined size. The quantity of cut vegetables is cooked. The quantity of cut vegetables has surface moisture removed. A flavoring material is imparted into the quantity of vegetables. The quantity of cut vegetables is substantially dehydrated, wherein each of the cut vegetables has a jerky-like texture, wherein shearing through the jerky-like texture requires a force of at least 30 N until a 95% strain is achieved utilizing a TA-HD Plus Texture Analyzer Device. The quantity of vegetable may include a quantity of potatoes.

19 Claims, 7 Drawing Sheets

(56) References Cited

U.S. PATENT DOCUMENTS

| | | | |
|---|---|---|---|
| 5,645,876 A | 7/1997 | Subramaniam et al. | |
| 5,707,671 A | 1/1998 | Beck et al. | |
| 5,955,130 A | 9/1999 | Gagliardi et al. | |
| 6,004,590 A | 12/1999 | Subramaniam et al. | |
| 6,086,933 A | 7/2000 | Rockstrom | |
| 6,599,547 B1 | 7/2003 | Villgran et al. | |
| 6,706,298 B1 | 3/2004 | Villagran et al. | |
| 6,815,000 B2 | 11/2004 | Kesler | |
| 7,014,879 B1 | 3/2006 | Lewis et al. | |
| 7,074,444 B2 | 7/2006 | Margolis | |
| 7,662,422 B2 | 2/2010 | Furtaw | |
| 8,277,858 B2 | 10/2012 | Bows et al. | |
| 8,277,865 B2 | 10/2012 | Bunke et al. | |
| 2002/0168463 A1* | 11/2002 | Villagran | A23B 7/02 426/637 |
| 2003/0044488 A1* | 3/2003 | Roskam | A23P 20/12 426/94 |
| 2003/0059518 A1 | 3/2003 | Miller et al. | |
| 2003/0068417 A1 | 4/2003 | Margolis | |
| 2004/0258823 A1 | 12/2004 | Dufresne et al. | |
| 2005/0163912 A1 | 7/2005 | White | |
| 2005/0260306 A1* | 11/2005 | Baldus | A23K 10/30 426/132 |
| 2006/0062892 A1* | 3/2006 | Merrick | A23K 10/30 426/635 |
| 2008/0010080 A1* | 1/2008 | Torney | A23K 50/40 705/1.1 |
| 2008/0181995 A1 | 7/2008 | Rawls | |
| 2013/0045317 A1* | 2/2013 | Ardisson-Korat | A23P 30/20 426/550 |

OTHER PUBLICATIONS

Uyehara, Mari, Serious Eats: Potatoes 101: All You Need to Know About Common Spuds, published Feb. 26, 2020, retrieved online Jul. 28, 2021, https://www.seriouseats.com/potato-shopping-storage-recipe-guide. (Year: 2020).*
Merriam-Webster, term common, retrieved online Jul. 28, 2021 https://www.merriam-webster.com/dictionary/common (Year: 2021).*
Adam Bradley, "Potato (*Solanum tuberosum*): Classification of the Potato", 2009, [retrieved on: Jul. 9, 2021], <http://bioweb.uwlax.edu/bio203/s2009/bradley_adam/Classification.htm>.
Cole Keesler, "Classification and Phylogeny of I. batatas", 2011, [retrieved on: Jul. 9, 2021], <http://bioweb.uwlax.edu/bio203/2011/keesler_cole/classification.htm>.
Serious Eats, "Serious Eats—Good Cooks Know How. Great Cooks Know Why", [online], 2021 [retrieved on Nov. 5, 2021]. Retrieved from <https://www.seriouseats.com/about-us-5120006>.

* cited by examiner

DEHYDRATED VEGETABLE FOOD PRODUCT AND METHODS OF MAKING THE SAME

CROSS-REFERENCE TO RELATED APPLICATIONS

This patent application is a Divisional of U.S. patent application Ser. No. 14/084,110, now U.S. Pat. No. 9,883,687, filed on Nov. 19, 2013, and titled "Dehydrated Vegetable Food Product and Methods of Making the Same," which claims the benefit of U.S. Provisional Patent Application No. 61/796,721, filed on Nov. 19, 2012, and titled "Cooked and/or Dehydrated Potato Pieces Textured, Shaped and Flavored to Taste, Feel and Chew Like Beef Jerky." Each of these patent applications is herein incorporated by reference in its entirety.

FIELD OF THE DISCLOSURE

The present disclosure is generally related to food products and food preparation methods and more particularly is related to a dehydrated vegetable food product and methods of making the same.

BACKGROUND

Currently, there are many types of edible snacks made for human consumption that are sold in food stores, convenience stores and the like. Of these snacks, jerky has for a long time been popular due to its unique and flavorful taste along with its tough, chewy consistency. The Oxford Dictionary defines the noun 'jerky' as "meat that has been cured by being cut into long, thin strips and dried."

The most popular jerky produced and sold on the market is beef jerky. Other meats are used to produce jerky and are sold on the market as turkey jerky, chicken jerky, pork jerky, venison jerky, and fish jerky. When properly produced and packaged, jerky is a shelf-stable product (having low water activity ($a_w$) of 0.85 or less), one that does not require refrigeration and will remain edible for extended periods of time after consumer purchase.

Jerky has a unique texture and consistency, which is tough and harder to chew than other snacks and consumable foods. It is a unique and preferred snack due to the fact it takes longer to chew than most foods and the person eating it can savor the flavor and eating process longer. These attributes make jerky a highly desired snack for consuming at home, at work, while driving in the car, or during outdoor activities, such as hiking, biking, and camping.

Consuming jerky requires more biting force than most other snack foods, as the person consuming it needs to bite down harder and with more force to shear the jerky food into smaller more palatable pieces in the mouth. Once it is broken down to smaller pieces in the mouth, the person may begin to start chewing the food in order to break it down, so it is soft enough and small enough to be safely swallowed. The shear force required for a human to bite through foods is best simulated and measured using a TA-HD Plus Texture Analyzer Device, which is testing equipment commonly used in the food industry by food producers to determine a food's particular hardness. This analyzer uses cutting blades to simulate the biting of the human front teeth and measures the force in grams (g), kilograms (kg), or Newtons (N) that is required to shear and cut the food being tested.

There are some beef jerky manufacturers that produce jerky pieces for sale that do not use solid strips of beef and instead use beef that has been ground into small pieces and is then extruded, formed, or pressed into an exacting shape and size of jerky strips. Although it has similar jerky taste, this extruded beef jerky product has a noticeably processed texture compared to solid meat pieces used to make beef jerky, and is a less preferable form of jerky for many consumers. In the past, there have been extruded jerky-type products made with various ground meats, such as chopped beef or ground chicken and also included potato flour as part of the ingredients.

For non-meat foods, the cooked potato vegetable is a healthy food containing complex carbohydrates, natural vitamins, minerals, dietary fiber, and anti-oxidants. However, unless the potatoes have first been cooked, potatoes are mainly indigestible to humans, provide little nutritional value, and people find eating them undesirable due to the raw bitter taste and very hard texture.

Cooking the potato vegetable differing ways can produce common potato foods such as baked potatoes, mashed potatoes, and potato salad. Consumers and food processors use a combination of cooking and/or frying with oil to produce other common potato foods such as potato chips, French fries, and hash browns. Food processors also use a combination of cooking and dehydrating potatoes to make potato flakes, which in turn are sold to consumers for the use in making instant mashed potato products. The consumer takes the dehydrated potato flakes and reconstitutes them into mashed potatoes by adding liquid, such as water or milk, and then by a process of heating and stirring the mixture.

Other food processors have cooked and then freeze-dried potato for use in food products intended with very long-term shelf-life, typically sold in sealed packages for use as rations for humans in emergencies, the military, and remote camping. The consumer commonly takes the freeze-dried potato product, adds warm water to mix, and thereby reconstitutes the potato to the food processor's original cooked potato state.

Regarding taste, there are flavoring companies that specialize in replicating the tastes of beef, chicken or any other type of meat or vegetable, or that can combine many of their uniquely developed flavors and seasonings to produce new and exciting tastes. Their natural flavors are used by many of the large manufacturers for flavoring potato chip products, drinks, soups, and many of our daily foods and are added to products to get the specifically manufacturer desired taste for the products they sell to consumers.

Beef and other meats contain protein and essential minerals including iron, but also contain fat and cholesterol, which can be unhealthy for the human diet. Beef and other meat jerky are relatively expensive for consumers, due to the high cost of the meat used and the associated manufacturing costs to make it. In making jerky, some food manufacturers utilize artificial preservatives, along with chemicals including monosodium glutamate, which is a known neurotoxin and may be unhealthy for human consumption.

In recent years, consumer mistrust of food processors and manufacturers of animal-based food products, such as beef, has risen due to the use of antibiotics, growth hormones, and pink-slime type additives in the meat food, as well as manufacturer forced recalls due to contamination from dangerous bacteria or pathogens, including mad cow disease.

Inexpensive foods, such as potatoes and other vegetables, are considered healthy to eat and contain many vitamins, essential minerals, and dietary fiber. However, vegetables are often not as desired for consumption as flavorful snacks because they lack the proper texture and taste when eaten raw or simply dehydrated, and lack the proper texture, taste, and shape that is sought after in a beef jerky product. Also, most vegetables have a short shelf-life, which may make them undesirable snacks if they have to be taken to areas for extended periods of time without proper refrigeration.

Thus, a heretofore unaddressed need exists in the industry to address the aforementioned deficiencies and inadequacies.

SUMMARY

Embodiments of the present disclosure provide a food product and method of making the same. Briefly described, in architecture, one embodiment of the food product, among others, can be implemented as follows. The food product includes a vegetable food product cut to a predetermined dimension, wherein the vegetable food product has been cooked for approximately 5-10 minutes at a temperature of approximately 212° F., and wherein the cooked vegetable food product has been dehydrated in a series of successive dehydration steps, wherein each of the successive dehydration steps has a temperature lower than a previous step. A flavoring material is imparted into the cooked, dehydrated vegetable food product between at least two of the dehydration steps within the series of successive dehydration steps, wherein the cooked, dehydrated vegetable food product has a jerky-like texture, whereby shearing through the jerky-like texture requires a force of at least 30 Newtons (N) until a 95% strain is achieved utilizing a TA-HD Plus Texture Analyzer Device.

The present disclosure can also be viewed as providing a method of making a dehydrated vegetable food product. In this regard, one embodiment of such a method, among others, can be broadly summarized by the following steps: cutting a quantity of vegetables to a predetermined size thereby forming a quantity of cut vegetables; cooking the quantity of cut vegetables; removing a surface moisture of the quantity of cut vegetables; imparting a first flavoring material into the quantity of cut vegetables; and substantially dehydrating the quantity of cut vegetables, wherein each of the cut vegetables has a jerky-like texture.

The present disclosure can also be viewed as providing a method of making a dehydrated potato food product. In this regard, one embodiment of such a method, among others, can be broadly summarized by the following steps: providing unprocessed potatoes; washing the unprocessed potatoes; cutting the unprocessed potatoes to a predetermined size, wherein the predetermined size further comprises a slice wherein a length and width of the slice substantially exceeds a thickness of the slice; cooking the potatoes at a temperature of approximately 212° F. for approximately between 5-10 minutes; adding a quantity of sugar to the potatoes during the step of cooking; partially dehydrating the potatoes for a first period of time at a first temperature; imparting a first quantity of flavoring material into the potatoes; partially dehydrating the potatoes for a second period of time at a second temperature; turning the potatoes over; partially dehydrating the potatoes for a third period of time at a third temperature; imparting a second quantity of flavoring material into the potatoes; partially dehydrating the potatoes for a fourth period of time at a fourth temperature; partially dehydrating the potatoes for a fifth period of time at a fifth temperature, wherein each of the first-fifth temperatures are all different from one another, and wherein the potatoes have a jerky-like texture; and cooling the potatoes.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

The present disclosure is for a vegetable food product that has a texture, taste, and shape similar to that of beef jerky, but is made of non-meat foods, preferably the potato. Other vegetables may be utilized but potatoes are a preferred vegetable due to their inherent vegetable qualities, low wholesale price, and semi-benign taste after having been cooked, as well as their nutritional value with many vitamins and minerals. Any type of potato may be used, including but not limited to Russet, Yukon Gold, Red, New, and Fingerlings, as well as any of the 4,000 other varieties of potatoes. The vegetable food product can be produced by a process of cooking and dehydrating potato or other vegetable pieces, which have been cut or sliced into a desired shape, and adding unique artificial flavors, natural flavors, and/or spices and seasonings to manufacture a tasty, edible alternative snack for humans that tastes like beef jerky (as well as any other desired meat jerky or other snack type flavors) and has the texture, toughness, and chewiness of beef jerky.

Figure 1:
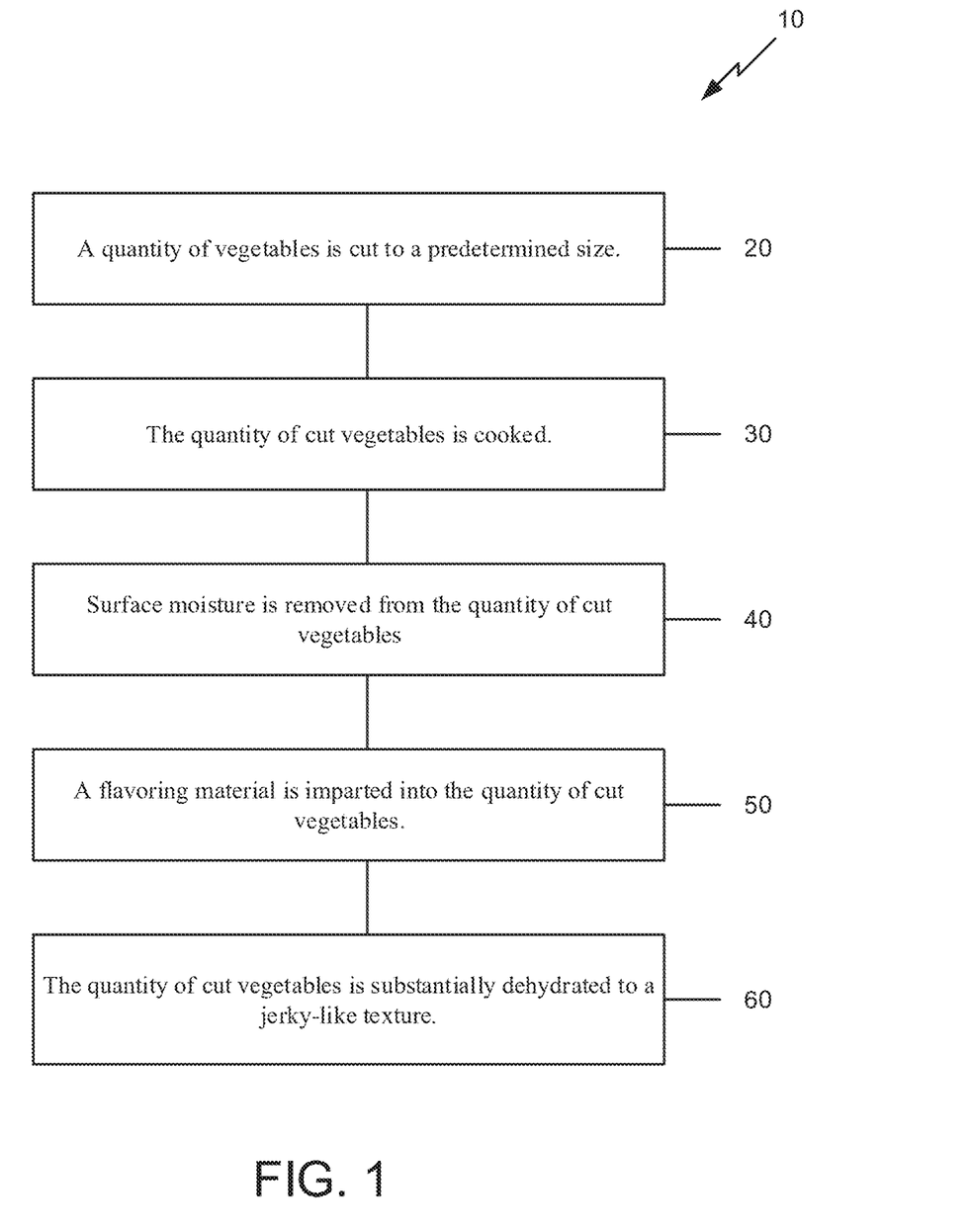
FIG. 1 is a flowchart illustrating a method of making a dehydrated vegetable food product, in accordance with the first exemplary embodiment of the present disclosure.

FIG. 1 is a flowchart 10 illustrating a method of making a dehydrated vegetable food product, in accordance with the first exemplary embodiment of the present disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown in block 20, a quantity of vegetables is cut to a predetermined size. The quantity of cut vegetables is cooked (block 30). Surface moisture is removed from the quantity of cut vegetables (block 40). A flavoring material is imparted into the quantity of cut vegetables (block 50). The quantity of cut vegetables is substantially dehydrated to a jerky-like texture, whereby shearing through the jerky-like texture requires a force of at least 30 N until a 95% strain is achieved utilizing a TA-HD Plus Texture Analyzer Device (block 60).

The quantity of vegetables is cut to a predetermined size, which may primarily include being cut to a slice, wherein a length and width of the slice substantially exceeds a thickness of the slice. The quantity of vegetables may be cut using any known method or device, including a hand-held knife, another blade, a cutting machine, or other types of cutting or slicing devices. The dimensions of the quantity of vegetables may vary depending on the type of vegetable and the application; however, a common thickness of the quantity of vegetables may be ¼ of an inch or less. As an optional step, the quantity of vegetables may be warmed prior to cutting. For example, the quantity of vegetables may be heated at approximately 120° F. for approximately 15 minutes just prior to the cutting stage of the manufacturing process. Heating the quantity of vegetables may facilitate easier cutting of the vegetables than without heating. The vegetable may also be immersed in water prior to, during, and after being cut. The water may be used to transport the vegetable prior to being cut, help speed the vegetable through cutting devices, as well as inhibit browning of the resulting cut vegetable pieces outer surface cells (normally caused to the vegetable pieces when exposed to oxygen). Optionally, the vegetable cuts may include the vegetable outer peel, which is a high source of vitamins and minerals.

After the quantity of vegetables is cut to the predetermined size, it may be cooked. Cooking may involve applying heat to the vegetable and raising the temperature to a preferred temperature for a measured period of time. For example, the quantity of vegetables may be cooked for approximately 5-10 minutes at an approximate temperature of 212° F. The cooking time and temperature may be dependent on the type of vegetable, the size of the cut of the vegetable, the intended outcome of the food product, and other factors. Common heating methods include, but are not limited to, boiling (in water or other liquid), cooking in moist environments, such as steaming, cooking in an oven or on a stove in a pan, and microwaving, along with various other commonly used heating methods in the food manufacture industry. The cooking of the vegetable may help eliminate any foodborne pathogens, remove the raw taste of the vegetable, and change the texture and consistency of the vegetable, as well as soften, toughen, moisten, or dry out the food to a desired amount. Typically, boiling or blanching the potato vegetable in water for specific times and temperatures may result in the potato starch becoming gelatinous or gelatinized.

The quantity of vegetables may be cooked to varying degrees. For example, cooking the quantity of vegetables may include heating the quantity of vegetables until a quantity of starch within the quantity of vegetables becomes gelatinized. Prior to being cooked, raw potato pieces are hard and whitish in color. After being cooked to the gelatinous state, the potato pieces become soft and light/translucent in color. The gelatinous potato pieces also have a mostly benign taste, with very little or barely discernible potato taste. The benign tasting potato is an ideal base food product, as any flavor coatings are mainly additives to the benign tasting potato. There may be no need to mask or alter any unwanted tastes of the gelatinized base potato when flavoring.

Additionally, by first cooking the quantity of vegetables and stopping the cooking process when the starch is in a gelatinous state, vegetable pieces that can be dehydrated and coated with flavors may look, feel, and have the texture and consistency very similar to actual beef jerky. If the quantity of vegetables is cooked too little in the cooking stage, the potato starch may not break down to a gelatinous state, resulting in a quantity of vegetables that may be hard and taste like raw potato. On the other hand, if the quantity of vegetables is cooked too much in the cooking stage, the starch may break down too much, resulting in vegetable pieces that may fall apart, crumble to small pieces, and have a rougher consistency. It may be critical to cook the cut potato pieces just the right amount to achieve the desired texture in the finished product. This texture may be achieved by the boiling and the consequent flavoring and dehydration process.

A quantity of sugar may be added to the quantity of vegetables before or during the cooking process. Adding sugar during the cooking process can positively impact the final texture of the vegetable pieces, making the vegetable pieces as a whole, and particularly the edges, softer and chewier. Without the use of sugar in the boiling process, the vegetable pieces may form harder edges during the drying/dehydration stages resulting in a dehydrated vegetable product that is rough and scratchy in the mouth, both undesirable attributes due to the texture being dissimilar to actual beef jerky.

Depending on the specific cooking process, cooking the quantity of vegetables may reduce or eliminate the production of acrylamide levels within the product. It may be desirable for the finished vegetable food product to have zero or very little acrylamide, compared with other vegetable products, such as potato chips or other potato products that have known moderate to high acrylamide levels. Acrylamide is a known neurotoxin and animal carcinogen. Acrylamide was accidentally discovered in foods in April 2002 by scientists in Sweden when they found the chemical in starchy foods, such as potato chips, French fries, and bread that had been heated-production of acrylamide in the heating process was shown to be temperature-dependent.

Acrylamide was not found in food that had been boiled or in foods that were not heated. When the quantity of vegetables is cooked via boiling or steaming means, among others, and then dehydrated at low temperatures, the amount of acrylamide may be substantially reduced or eliminated within the quantity of vegetables.

Once the quantity of cut vegetables is cooked, it may have any free or unbound surface moisture removed, including cells one or two deep or more, from the outer vegetable surface. Removal of this surface moisture may be attained by utilizing a strainer, air dry, forced air, heat, vibration, centrifuge, temporary contact with a dry material, or other common methods used in the food processing industry. Completing an initial surface moisture removal stage to the vegetable pieces before applying any flavoring may help drive off free or unbound moisture from the outer surfaces of the vegetable pieces and may help get the vegetable product moisture and temperature to an optimum level for proper adhesion, penetration, and absorption of the flavor coating.

Once the quantity of vegetables is cooked, it may also be dehydrated a first time. Dehydrating may involve heating the vegetable at a typically lower temperature than cooking and using a fan or other air movement device to circulate warm air throughout the area holding the quantity of vegetables. The warm, circulating air may remove water and other moisture from the quantity of vegetables, and the moisture is expelled from the area to help dehydrate the quantity of vegetables. Dehydration of the quantity of cut and cooked vegetables may be utilized to help achieve the desired texture and consistency of the final jerky-like product. Dehydration may be achieved through the use of one of, or a combination of two or more, but not limited to, the following devices or processes: hot air dryers, multi-zone dryers, infrared dryers, radio frequency dryers, jet impingement, solar dehydrators, and fluid bed drying. While dehydrating processes may be typical in the food industry and may be applied within the present disclosure, the specific series of cooking, dehydrating, and flavor-imparting steps is not currently utilized within the industry. Completing an initial dehydration stage to the vegetable pieces before applying any coating may help drive off moisture on the vegetable pieces and help get the vegetable product moisture and temperature to an optimum level for proper adhesion, penetration, and absorption of the flavor coating.

Removing surface moisture and/or utilizing a first dehydration step after cooking may assist with effectively applying the first flavoring material, since the flavoring material may hold much better to drier vegetable pieces than to vegetable pieces proximately after cooking.

Once the quantity of cut vegetables has surface moisture removed and/or been dehydrated a first time, a flavoring material is imparted into the quantity of cut vegetables. This flavoring material may be imparted in various times throughout the processing of the quantity of cut vegetables. For example, the flavoring material may be imparted only once to the cut vegetables immediately after removing surface moisture or multiple flavor-imparting processes may be utilized in latter dehydration processes.

The flavoring material may be incorporated into the vegetable through the use of a preferred seasoning mixture or marinade. Flavoring may involve soaking, dipping, submerging, marinating, spraying, or injecting the vegetable, along with any other seasoning and marinade means common in the food manufacture industry. When flavorings containing liquid are imparted one or more times to the cut of vegetable, they may provide seasoning through absorption and adhesion, and they may also rehydrate the vegetable, adding 8% to 13% moisture content to its current moisture content state. This temporary rehydration of the cut of vegetable during dehydration stages, happening one or more times, may help to further develop the tough and chewy texture of the vegetable that is desired in the finished food product.

The quantity of cut vegetables may then be substantially dehydrated to produce a jerky-like product with a jerky-like texture, whereby shearing through the jerky-like texture requires a force of at least 30 N until a 95% strain is achieved utilizing a TA-HD Plus Texture Analyzer Device (block 60). Dehydration of the quantity of vegetables may initially happen after the quantity of vegetables is cooked, or alternately after flavoring is first imparted into the vegetable. During dehydration, the quantity of vegetables may be lifted, flipped, turned, and/or rotated. The end product that is produced should be a jerky-like product having a similar texture and feel as conventional beef jerky has, in that the vegetable food product may have organoleptic properties very similar to beef jerky (taste, sight, smell and touch-including its texture, toughness, and chewiness). It may be critical to achieve just the right texture of the vegetable pieces, so it may be perceived like beef jerky by the end consumer.

The texture of the jerky-like product may be measured using a texture analysis process or machine, such as the TA-HD Plus Texture Analyzer. An example of the texture analysis process using the TA-HD Plus Texture Analyzer is set forth below:

Example 1

Texture analysis on dehydrated vegetable food product with jerky-like texture and actual beef jerky was performed on a TA-HD Plus Texture Analyzer from Stable Micro Systems. The samples were trimmed to a uniform width (16 mm) so the stress applied could be compared directly between samples. The instrument setup used for the analysis was a stainless blade with a 30° symmetrical wedge in contact with the sample on a flat platen. The instrument was programmed to move the probe at 2 mm/sec until it contacted the sample surface; it then proceeded at 1 mm/sec until 95% strain was induced. Strain is the change in sample shape induced by the stress applied by the probe. The term "95% strain" may be characterized to mean that the probe moved 95% of the way through the sample. Some other potentially confounding effects were samples with non-uniform dimensions and wrinkles or curves. These effects were observed and reduced as much as possible but were not completely eliminated. A total of 5 sets of samples were tested, and are outlined below.

Three sets of dehydrated vegetable food product with jerky-like texture were produced at the Food Technology Center, in Caldwell, Idaho, and were submitted for texture analysis: the first set, labeled Sample ID "2013-MED-11634-01, replicate #1 through 4," was produced on Oct. 22, 2013, the second set, Sample ID "2013-MED-11634-02, replicate #4 through 7," was produced on Jul. 22, 2013, and the third set, Sample ID "2013-MED-11634-03, replicate #1 through 5," was produced on Oct. 22, 2013.

Two sets of actual beef jerky product were submitted for texture analysis: the first set, with sample ID "2013-MED-11634-04, replicate #1 through 9," was beef jerky samples from a 3-ounce bag of Oberto® Brand Beef Jerky (Original Thin Style), purchased Oct. 23, 2013, at Albertson's, 7100 W. State St., Boise, Idaho, 83703, with a lot number of 14:23, UPC code of 7041160213, and a Best By Date written as 18JUN14 82; and the second set, with sample ID "2013-MED-11634-05, replicate #1 through 7," was beef jerky samples from a 3.25-ounce bag of Tillanmook Country Smoker® Beef Jerky (Old Fashioned, Premium Thin Cuts), purchased Oct. 23, 2013, at Albertson's, 7100 W. State St., Boise, Idaho, 83703, with a lot number of 13:04-11843, a UPC code of 5194310030, and a Best By date of Jan. 4, 2015.

The texture analysis results from the 5 sets of tested food samples were compiled in TABLE 1, below:

TABLE 1

Table 1:

| Sample ID replicate # | Peak Force (N) | Work (area, N*sec) |
|---|---|---|
| 2013-MED-11634-01 1 | 164.432 | 158.240 |
| 2013-MED-11634-01 2 | 177.412 | 165.114 |
| 2013-MED-11634-01 3 | 145.891 | 144.597 |
| 2013-MED-11634-01 4 | 155.352 | 154.729 |
| Average: | 160.772 | 155.670 |
| S.D. | 13.430 | 8.550 |
| Coef. of Variation | 8.353 | 5.492 |
| 2013-MED-11634-02 4 | 156.280 | 151.849 |
| 2013-MED-11634-02 5 | 100.317 | 101.094 |
| 2013-MED-11634-02 6 | 148.329 | 145.762 |
| 2013-MED-11634-02 7 | 169.980 | 164.540 |
| Average: | 143.727 | 140.811 |
| S.D. | 30.290 | 27.610 |
| Coef. of Variation | 21.074 | 19.608 |
| 2013-MED-11634-03 1 | 41.266 | 51.309 |
| 2013-MED-11634-03 2 | 50.865 | 68.919 |
| 2013-MED-11634-03 3 | 77.489 | 95.853 |
| 2013-MED-11634-03 4 | 86.784 | 119.201 |
| 2013-MED-11634-03 5 | 107.652 | 133.737 |
| Average: | 72.811 | 93.804 |
| S.D. | 26.962 | 34.165 |
| Coef. of Variation | 37.030 | 36.421 |
| 2013-MED-11634-04 1 | 201.106 | 226.679 |
| 2013-MED-11634-04 2 | 168.145 | 209.204 |
| 2013-MED-11634-04 3 | 190.481 | 225.606 |
| 2013-MED-11634-04 4 | 153.641 | 177.976 |
| 2013-MED-11634-04 5 | 182.946 | 168.735 |
| 2013-MED-11634-04 6 | 166.683 | 165.704 |
| 2013-MED-11634-04 7 | 162.548 | 163.954 |
| 2013-MED-11634-04 8 | 154.729 | 170.234 |
| 2013-MED-11634-04 9 | 134.505 | 167.285 |
| Average: | 168.309 | 186.153 |
| S.D. | 20.493 | 26.507 |
| Coef. of Variation | 12.176 | 14.239 |
| 2013-MED-11634-05 1 | 102.305 | 86.843 |
| 2013-MED-11634-05 2 | 79.241 | 60.359 |
| 2013-MED-11634-05 3 | 58.809 | 51.713 |
| 2013-MED-11634-05 4 | 26.014 | 19.843 |
| 2013-MED-11634-05 5 | 29.893 | 19.691 |
| 2013-MED-11634-05 6 | 48.268 | 43.587 |
| 2013-MED-11634-05 7 | 56.877 | 41.806 |
| Average: | 57.344 | 46.263 |
| S.D. | 26.835 | 23.474 |
| Coef. of Variation | 46.797 | 50.741 |

As shown in Example 1, the texture analysis process with the TA-HD Plus Texture Analyzer may include subjecting the dehydrated vegetable product to a shear analysis test, where the force of shearing the product is determined. In this process, cutting blades are used to simulate biting with the front teeth, which can be used to measure a hardness or texture of the product. Experimentation with the product herein has shown that a successful dehydrated vegetable product with jerky-like texture requires a force of at least approximately 30 Newtons (N) to achieve a 95% strain with the aforementioned procedure using the TA-HD Plus Texture Analyzer Device.

Other numerical achievements using the TA-HD Plus Texture Analyzer Device may also be desired. For example, a force of between 30 N to 300 N until a 95% strain is achieved using the TA-HD Plus Texture Analyzer device may be preferable. Other preferable levels using the TA-HD Plus Texture Analyzer Device may include a force above 50 N, 75 N, 100 N, 125 N, 160 N, or greater until a 95% strain is achieved, a force of between 50 N to 250 N until a 95% strain is achieved, a force of between 75 N to 250 N until a 95% strain is achieved, a force of between 100 N to 250 N until a 95% strain is achieved, and a force of between 100 N and 180 N until a 95% strain is achieved, as well as any other specific levels, including those beyond Example 1.

As is similar to beef jerky, when bending the final vegetable food pieces, they may bend but not break. The vegetable food may require extra force by the human teeth in order to tear or shear apart into separate pieces, compared to other non-jerky snacks or foods. As is similar to beef jerky, one part of a vegetable food piece may need to be held down with the teeth and an opposing part is held with fingers; the fingers pull the part of the piece being held away from the teeth resulting in a tearing action that produces two separate pieces, one in the mouth and the other in the hand. The toughness and chewiness of the vegetable pieces may require the person eating them to chew them longer in the mouth than most non-jerky snack foods, to break down the tough consistency to a point that it may be easier swallowed and also to savor the taste longer. The vegetable food pieces are not crunchy or brittle when eaten in the mouth and are dissimilar to all potato snack foods with crunchy and brittle textures, such as potato chips and potato fry snacks. The vegetable food pieces are not oily and soft on the inside and slightly crunchy or firm on the outside when eaten in the mouth, as is common with other fried potato foods such as French fries or hash browns. The vegetable food pieces are not soft or mushy when eaten in the mouth, as is common with other potato foods such as baked potatoes, mashed potatoes, or potato salad. Commonly, the finalized dehydrated vegetable food product will have a moisture content level under 15%, and more preferably, in a range from 6.5% to 10%.

Preferably, the finished vegetable food product is mostly rectangular in shape, with a length, width, and thickness similar to that of beef jerky. However, the final food pieces may optionally be roundish, oval, squarish, long and stringy, tube-shaped, nugget-shaped, or any other imaginable or desired shape. Preferably, each individual vegetable food piece has its own unique shape and look, which may include smaller and larger pieces, sides that are not exactly parallel, sides that may be somewhat straight on one side and rounded on the other, warped pieces, curled edges, toast points, variations in color, edges containing outer peel, and any other uniquely identifiable attributes.

Additional dehydrations steps and/or processes may also be utilized, intertwined with flavor-imparting steps. When successive dehydration steps are used, each step may include dehydration of the quantity of vegetables for a specific period of time and at a specific temperature, and each step may be different from a previous step. For example, it is common for later dehydration steps to have lower temperatures than earlier dehydration steps. By starting with the highest temperature, the initial drying stage may remove the majority of the moisture of the quantity of vegetables after the first cooking stage. At each successive dehydration stage, the temperature may be lowered, which may continue to effectively and efficiently remove moisture from the vegetable pieces without causing undesired attributes to the texture of the final food product. It may be critical that the temperature in the initial dehydration stage, and other dehydrations stages that follow, be low enough to not cause the dehydrating vegetable to develop crusty or hard edges, generalized brittleness, or case hardening. Case hardening happens when outer surface food cells dry faster than the inner cells and results in a hardened outer surface with moisture trapped on the inside. The dehydration process may optionally utilize only one temperature for one or several dehydration stages to complete the entire dehydration process. Optionally, a dehydration temperature of 160° F. or higher may be used for a limited time during the dehydration process as a means of eliminating any foodborne pathogens. Also, the number of dehydration steps, as well as temperatures used during each dehydration step, may need to be adjusted to achieve the desired final texture characteristics due to differences in potato variety, solid levels of the potato, age of the potato from harvest, drying conditions, and other food processing variables.

Furthermore, a plurality of flavoring steps may be included in the method using a single flavoring material, or a plurality of flavoring materials. For example, a single flavoring material may be imparted into the quantity of vegetables after the first dehydration step, and the same flavoring material may be imparted into the quantity of vegetables during any subsequent flavoring steps. In one of many alternatives, subsequent flavoring steps may include other flavoring materials, including flavoring materials with different applications and/or textures. For example, one flavoring step may include injecting a liquid flavoring material into the quantity of vegetables, while a subsequent flavoring step may include coating the quantity of vegetables with a powdered flavoring material. By applying a flavoring material two or more separate times during the dehydration process, a cooked, dehydrated potato, for example, may change from the initial light/translucent color to a medium light color after the first flavor material application, and then to a darker color after a second flavor material application. With the cooked potato pieces starting out at a light color, the color of the flavoring material will mostly be taken on by the vegetable more and more through each flavoring material application.

The vegetable food product may be flavored to have any desired taste. For example, any type of natural or artificial flavors and/or spices may be used to produce a tasty, edible alternative snack for human consumption that tastes like beef jerky or a jerky meat product, but is made of a vegetable. Common flavors for human consumption may include regular, peppered, teriyaki, jalapeno, wasabi, and tabasco sauce, just to name a few. The vegetable food product may include any type of natural vitamins, minerals, and anti-oxidants, as would commonly be found in vegetables. The product may contain natural preservatives, such as salt, sugar, vinegar, or artificial preservatives to prevent food spoilage and to inhibit any bacterial growth. Gums or hydrocolloids may be added to alter the texture of the product. Oils, gluten, spices, and energy-boosting ingredients such as ground coffee beans, coffee bean extract, guarana, ginseng, taurine, and lysine may be optionally included within the food product.

The vegetable food product may also be subjected to other processing, such as using a machine device to puncture the vegetable with a row of needles or blades in order to tenderize the vegetable or to help with penetration and absorption of seasonings. The vegetable may also be subjected to other binding agents and/or additive materials, as well as additives in order to produce a vegetable food product with a more fibrous texture.

Figure 2A:
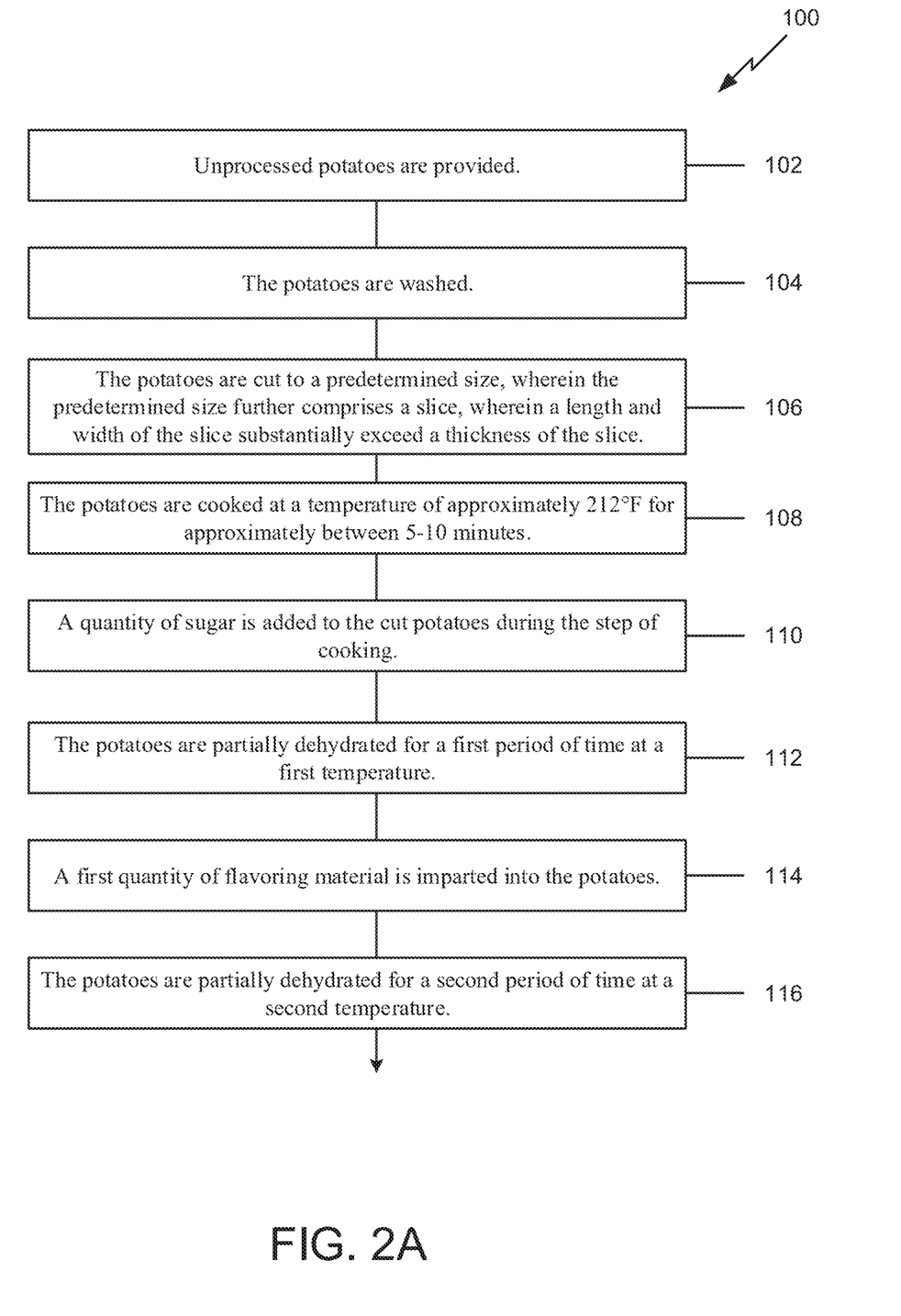
FIG. 2A is a flowchart illustrating a method of making a dehydrated potato food product, in accordance with a second exemplary embodiment of the disclosure.
Figure 2B:
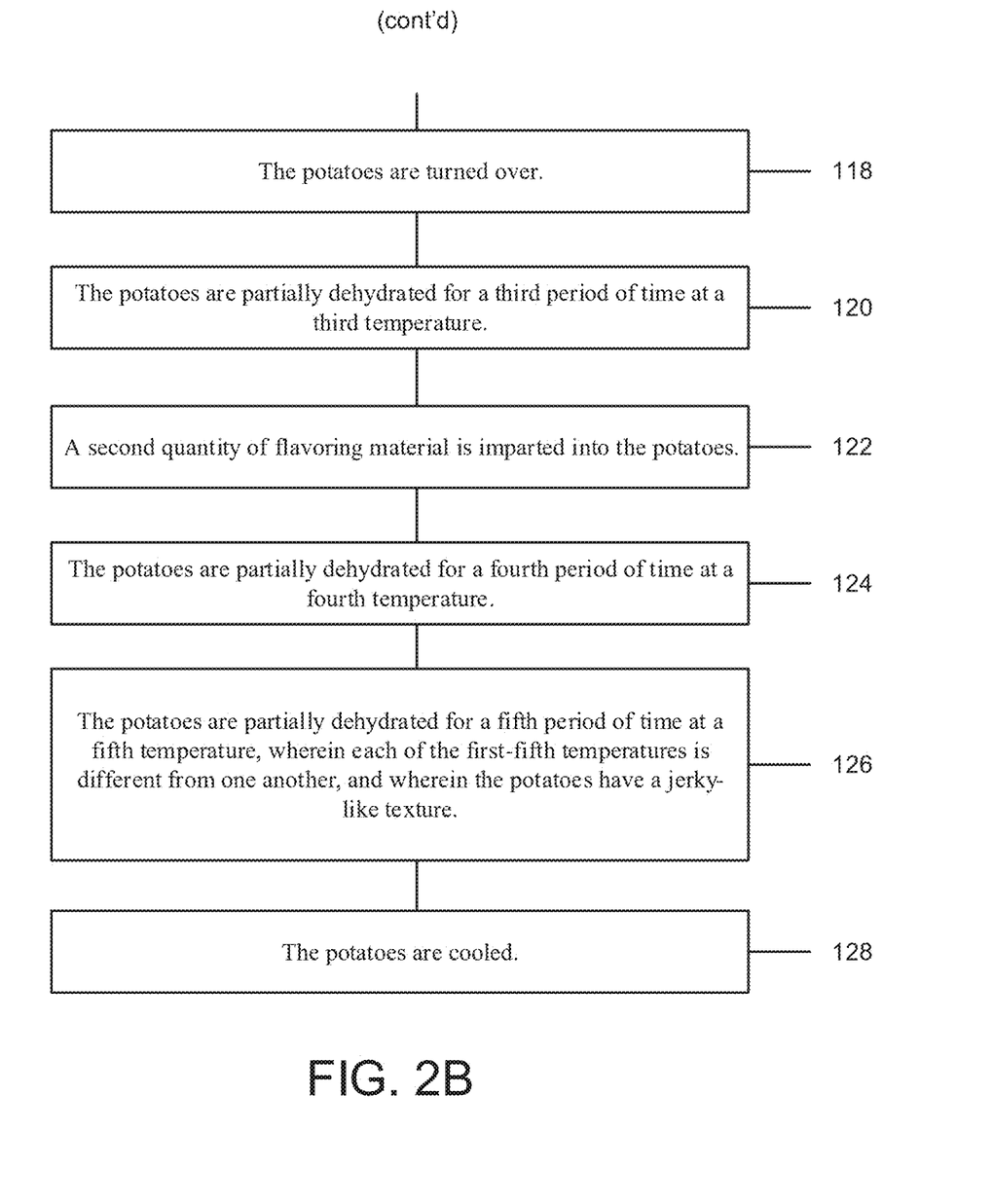
FIG. 2B is a continuation flowchart of FIG. 2A illustrating a method of making a dehydrated potato food product, in accordance with a second exemplary embodiment of the disclosure.

FIG. 2A is a flowchart 100 illustrating a method of making a dehydrated potato food product, in accordance with a second exemplary embodiment of the disclosure. FIG. 2B is a continuation flowchart 100 of FIG. 2A illustrating a method of making a dehydrated potato food product, in accordance with a second exemplary embodiment of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 102, unprocessed potatoes are provided. The unprocessed potatoes are washed (block 104). The unprocessed potatoes are cut to a predetermined size, wherein the predetermined size further comprises a slice wherein a length and width of the slice substantially exceeds a thickness of the slice (block 106). The potatoes are cooked at a temperature of approximately 212° F. for approximately between 5-10 minutes (block 108). A quantity of sugar is added to the potatoes during the step of cooking (block 110). The potatoes are partially dehydrated for a first period of time at a first temperature (block 112). A first quantity of flavoring material is imparted into the potatoes (block 114). The potatoes are partially dehydrated for a second period of time at a second temperature (block 116). The potatoes are turned over (block 118). The potatoes are partially dehydrated for a third period of time at a third temperature (block 120). A second quantity of flavoring material is imparted into the potatoes (block 122). The potatoes are partially dehydrated for a fourth period of time at a fourth temperature (block 124). The potatoes are partially dehydrated for a fifth period of time at a fifth temperature, wherein each of the first-fifth temperatures is different from one another, and wherein the potatoes have a jerky-like texture (block 126). The potatoes are cooled (128).

The method may include any number of steps, processes, or functions, including any of steps, processes, or functions disclosed within this disclosure. For example, in terms of specific times and temperatures for dehydration, the method may include the following: the first period of time is approximately 60 minutes, and the first temperature is approximately 150° F.; the second period of time is approximately 60 minutes, and the second temperature is approximately 140° F.; the third period of time is approximately 60 minutes, and the third temperature is approximately 135° F.; the fourth period of time is approximately 120 minutes, and the fourth temperature is approximately 125° F.; and the fifth period of time is approximately 60 minutes, and the fifth temperature is approximately 115° F. Other variations on the dehydration conditions may be included, too, depending on the type of potato used, the size of the slice, the type and level of cooking, and the type of flavoring material used.

Figure 3:
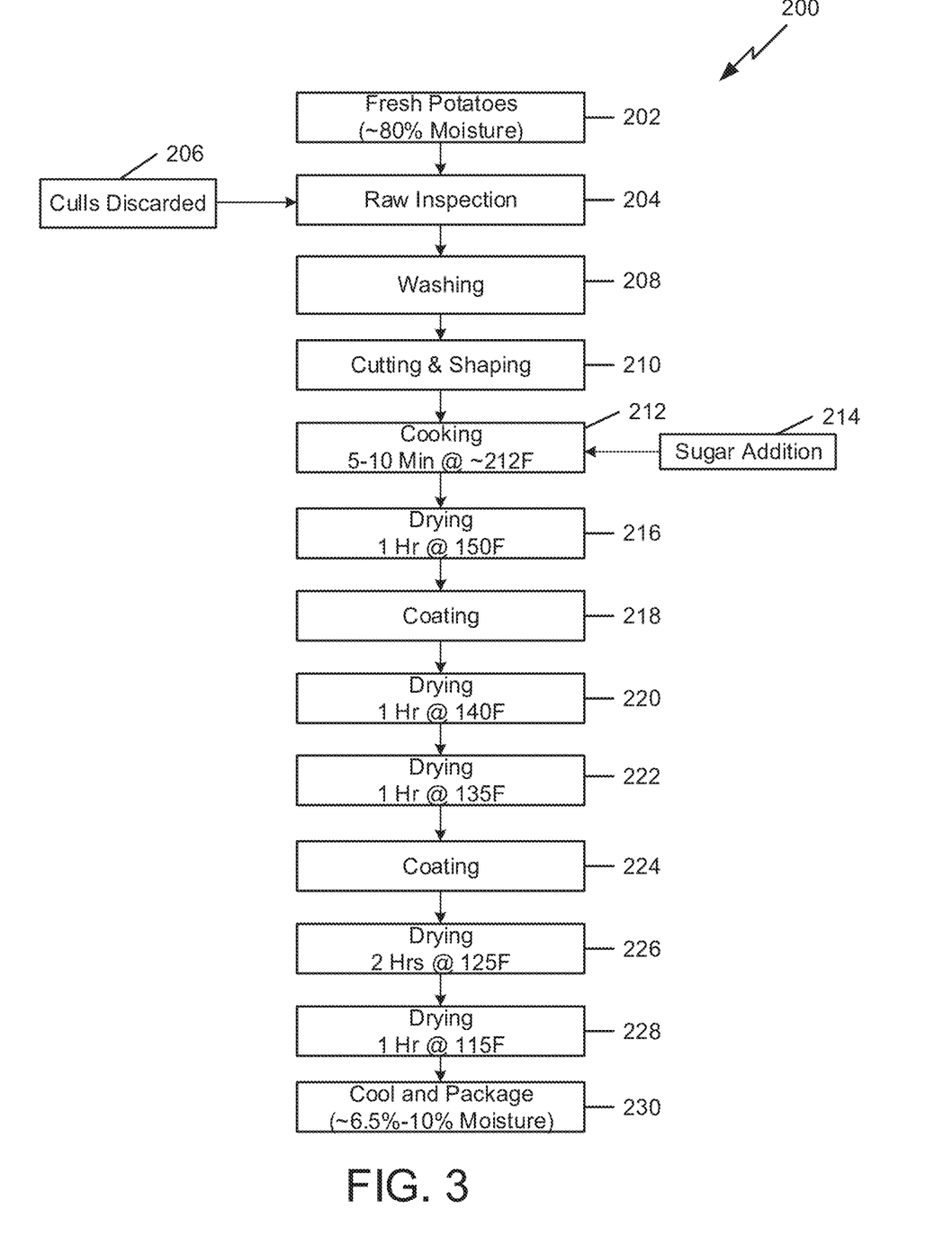
FIG. 3 is a block diagram flowchart illustrating the method of making a dehydrated potato food product of FIGS. 2A-2B, in accordance with the second exemplary embodiment of the disclosure.

FIG. 3 is a block diagram flowchart 200 illustrating the method of making a dehydrated potato food product of FIGS. 2A-2B, in accordance with the second exemplary embodiment of the disclosure. As can be seen in FIG. 3, fresh potatoes with a moisture level of around 80% are provided (block 202). A raw inspection is conducted (block 204), and culls may be discarded (block 206). The potatoes are washed (block 208), and the potatoes are cut or shaped to a predetermined size (block 210). The potatoes are then cooked for 5-10 minutes at a temperature of approximately 212° F. (block 212), and a quantity of sugar is added during cooking (block 214). The potatoes are then dried for 1 hour at a temperature of 150° F. (block 216). Then, the potatoes are coated with a flavoring material (block 218), and subsequently dried for 1 hour at a temperature of 140° F. (block 220). The potatoes may be flipped and then dried again for approximately 1 hour at a temperature of 135° F. (block 222). Another coating of flavoring material is applied (block 224), and the potatoes are dried again for 2 hours at a temperature of 125° F. (block 226). Then, another drying process for 1 hour at a temperature of 115° F. (block 228), after which the potatoes, having a moisture level ranging from 6.5% to 10%, are cooled and packaged (block 230). The method may include any number of steps, processes, or functions, including any of the steps, processes, or functions disclosed within this disclosure.

Figure 4:
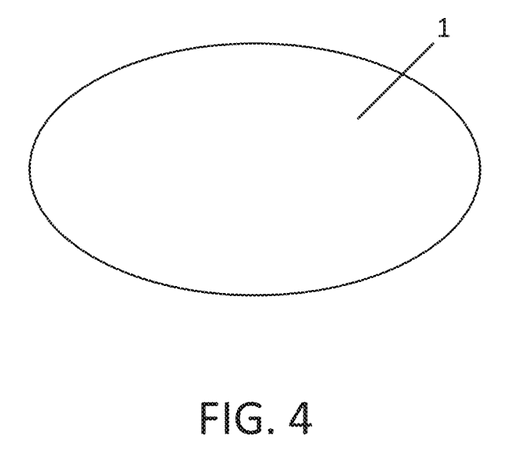
FIG. 4 is a front view of a common potato, in accordance with a third exemplary embodiment of the present disclosure.
Figure 5:
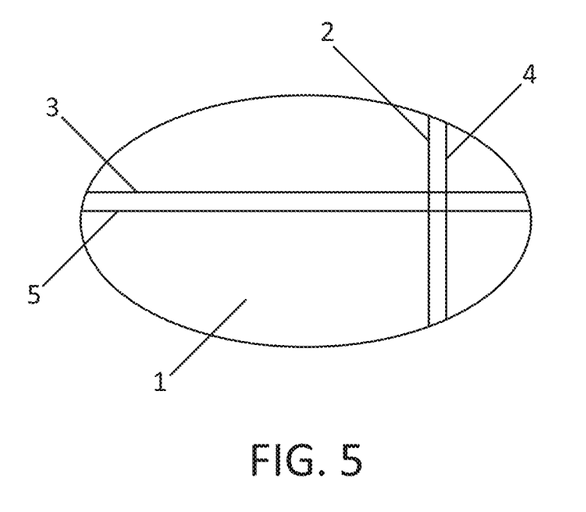
FIG. 5 is a front view of the common potato of FIG. 4 with cut-line markings, in accordance with the third exemplary embodiment of the present disclosure.
Figure 6:
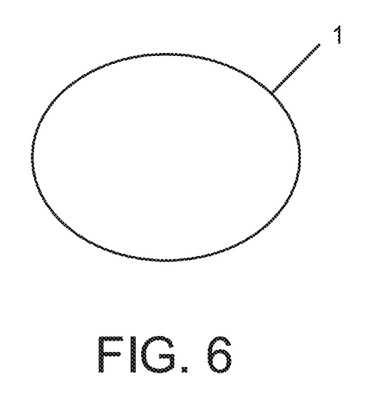
FIG. 6 is a top view of the common potato of FIG. 5 along the cut-lines 2 and 4, in accordance with the third exemplary embodiment of the present disclosure.
Figure 7:
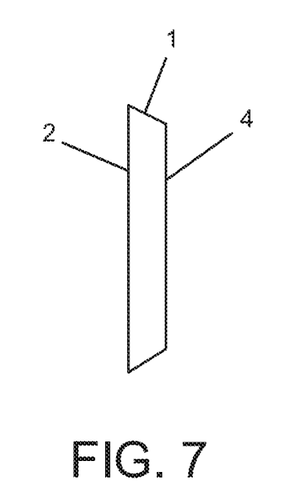
FIG. 7 is a front view of a slice of the common potato of FIG. 5 along the cut-lines 2 and 4, in accordance with the third exemplary embodiment of the present disclosure.
Figure 8:
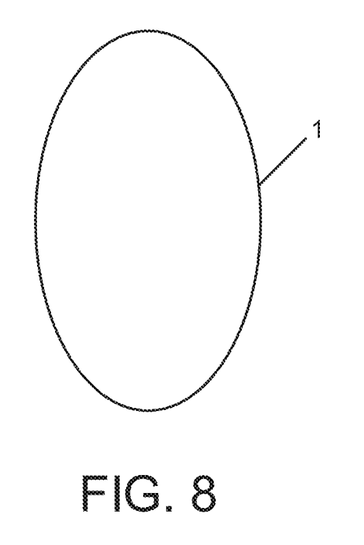
FIG. 8 is a top view of the common potato of FIG. 5 along the cut-lines 3 and 5, in accordance with the third exemplary embodiment of the present disclosure.
Figure 9:
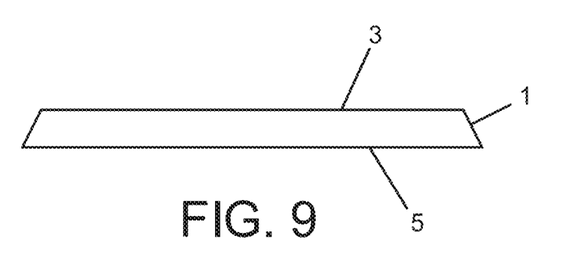
FIG. 9 is a front view of the common potato of FIG. 5 along the cut-lines 3 and 5, in accordance with the third exemplary embodiment of the present disclosure.
Figure 10:
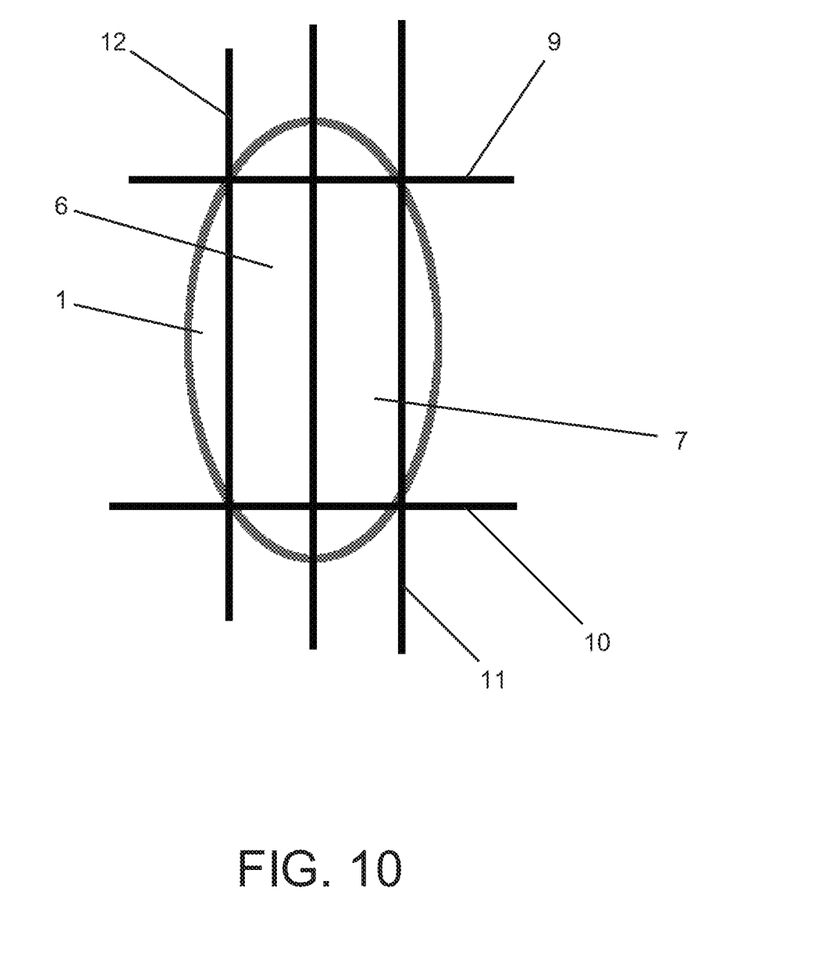
FIG. 10 is a top view of the common potato of FIG. 9, in accordance with the third exemplary embodiment of the present disclosure.

FIGS. 4-10 are illustrations of a common potato having various cutting options. FIG. 4 is a front view of a common potato, in accordance with a third exemplary embodiment of the present disclosure. FIG. 5 is a front view of the common potato of FIG. 4 with cut-line markings, in accordance with the third exemplary embodiment of the present disclosure. FIG. 6 is a top view of the common potato of FIG. 5 along the cut-lines 2 and 4, in accordance with the third exemplary embodiment of the present disclosure. FIG. 7 is a front view of a slice of the common potato of FIG. 5 along the cut-lines 2 and 4, in accordance with the third exemplary embodiment of the present disclosure. FIG. 8 is a top view of the common potato of FIG. 5 along the cut-lines 3 and 5, in accordance with the third exemplary embodiment of the present disclosure. FIG. 9 is a front view of the common potato of FIG. 5 along the cut-lines 3 and 5, in accordance with the third exemplary embodiment of the present disclosure. FIG. 10 is a top view of the common potato of FIG. 9, in accordance with the third exemplary embodiment of the present disclosure.

With reference to FIGS. 4-10, the common potato 1 may be cut using any applicable cutting instrument. The potato 1 may be cut down and cross across the potato 1 along cut-line 2. By cutting along cut-line 4, which is cut a desired distance apart, but on an exact parallel plane as cut-line 2, one would get a potato slice as depicted in FIGS. 6-7, i.e., long oval or roundish/oval shaped potato pieces. From FIG. 5, if one uses a cutting instrument to cut down and across potato 1 where indicated with cut-line 3, the result would be a potato cross section depicted in FIG. 8. By cutting along cut-line 5, which is cut a desired distance apart, but on the exact parallel plane as cut-line 3, the result would be a potato 1 slice as depicted in FIG. 9. Relative to FIGS. 9-10, by using the potato 1 slice as depicted in FIG. 9, one could cut across potato 1 where indicated with cut-lines 9, 10, 11, and 12 (FIG. 10), which would result in rectangular shaped potato slices 6 and 7, similar to the shape of a rectangular shaped beef jerky piece.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A dehydrated potato food product comprising:
cooked, dehydrated potato;
wherein the cooked, dehydrated potato comprises a plurality of potato slices, each potato slice having a length, a width, and a thickness, wherein the length and the width of the slice exceeds the thickness of the slice and wherein each potato slice originates from a single potato; and
wherein the cooked, dehydrated potato has a jerky-like texture, wherein the jerky-like texture requires a shearing force of at least 30 Newtons (N) until a 95% strain is achieved using a texture analyzer device.

2. The dehydrated potato food product of claim 1, wherein the dehydrated potato food product has a moisture content of about 15% or less by weight.

3. The dehydrated potato food product of claim 1, wherein the dehydrated potato food product has a moisture content in the range of about 6.5-10% by weight.

4. The dehydrated potato food product of claim 1, wherein the dehydrated potato food product has a water activity ($a_w$) of about 0.85 or less.

5. The dehydrated potato food product of claim 1, further comprising a first flavoring material imparted to the cooked, dehydrated potato.

6. The dehydrated potato food product of claim 5, wherein the first flavoring material is characterized as having a flavor of at least one of sugar, salt, pepper, vinegar, teriyaki, jalapeno, wasabi, tabasco sauce, and coffee.

7. The dehydrated potato food product of claim 5, wherein the first flavoring material comprises a moist flavoring material that has been at least partially absorbed by the cooked, dehydrated potato.

8. The dehydrated potato food product of claim 5, wherein the first flavoring material comprises at least one of:
a seasoning mixture applied to an exterior surface of the cooked, dehydrated potato; and
a marinade applied to the cooked, dehydrated potato.

9. The dehydrated potato food product of claim 8, wherein the seasoning mixture comprises a powdered flavoring material.

10. The dehydrated potato food product of claim 8, wherein the marinade comprises at least one of a liquid marinade, a sprayable marinade, and an injectable marinade.

11. The dehydrated potato food product of claim 5, further comprising a second flavoring material imparted to the cooked, dehydrated potato, wherein the first flavoring material and the second flavor material differ in composition.

12. The dehydrated potato food product of claim 1, wherein the cooked, dehydrated potato comprises potato which has been cooked for approximately 5-10 minutes at a temperature of approximately 212° F.

13. The dehydrated potato food product of claim 12, wherein the potato has been so cooked in a sugar solution.

14. The dehydrated potato food product of claim 1, wherein the cooked, dehydrated potato comprises potato which has been dehydrated in a series of successive dehydration steps, wherein each successive dehydration step is of a temperature lower than a previous dehydration step.

15. The dehydrated potato food product of claim 1, wherein a quantity of starch of the cooked, dehydrated potato has been gelatinized.

16. The dehydrated potato food product of claim 1, wherein the jerky-like texture requires the shearing force of at least 50 N, at least 75 N, at least 100 N, at least 125 N, or at least 160 N until the 95% strain is achieved using the texture analyzer device.

17. The dehydrated potato food product of claim 1, wherein the jerky-like texture requires the shearing force of between about 50-250 N until the 95% strain is achieved using the texture analyzer device.

18. The dehydrated potato food product of claim 1, further comprising a quantity of at least one of sugar, salt, vinegar, a preservative, a gum, a hydrocolloid, an oil, gluten, a spice, ground coffee beans, coffee bean extract, guarana, *ginseng*, taurine, and lysine.

19. The dehydrated potato food product of claim 1, wherein the cooked, dehydrated potato has been tenderized via a puncturing element.

* * * * *